(12) United States Patent
Darbyshire et al.

(10) Patent No.: US 12,134,099 B2
(45) Date of Patent: Nov. 5, 2024

(54) NEEDLE-LESS ACCESS VIAL AND CAP FOR THE ASEPTIC SAMPLING AND STORAGE OF LIQUIDS

(71) Applicant: Invetech, Inc., San Diego, CA (US)

(72) Inventors: Paul Darbyshire, Bentleigh (AU); Phillip Duncan, Broadford (AU)

(73) Assignee: Invetech IP LLC, San Diego, CA (US)

( * ) Notice: Subject to any disclaimer, the term of this patent is extended or adjusted under 35 U.S.C. 154(b) by 520 days.

(21) Appl. No.: 17/335,737

(22) Filed: Jun. 1, 2021

(65) Prior Publication Data
US 2022/0379302 A1 Dec. 1, 2022

(51) Int. Cl.
*B01L 3/00* (2006.01)
*A01N 1/02* (2006.01)
*A61J 1/14* (2023.01)

(52) U.S. Cl.
CPC ........ *B01L 3/50825* (2013.01); *A01N 1/0268* (2013.01); *A61J 1/1418* (2015.05);
(Continued)

(58) Field of Classification Search
CPC ........... B01L 3/50825; B01L 2200/026; B01L 2200/0605; B01L 2200/0689; B01L 2200/085; B01L 2200/141; B01L 2300/042; B01L 2300/0832; B01L 3/561; B01L 2300/046; A01N 1/0268; A01N 1/0263; A61J 1/1418; A61J 1/1425
(Continued)

(56) References Cited

U.S. PATENT DOCUMENTS

| 4,541,537 A | 9/1985 | Sailor |
| 5,634,880 A | 6/1997 | Feldman et al. |

(Continued)

FOREIGN PATENT DOCUMENTS

| DE | 202006012253 | * 12/2006 |
| EP | 0247274 | 12/1987 |

(Continued)

OTHER PUBLICATIONS

Written Opinion and International Search Report for corresponding International Patent Application No. PCT/US2022/31295 dated Sep. 1, 2022.

*Primary Examiner* — Jill A Warden
*Assistant Examiner* — Jacqueline Brazin
(74) *Attorney, Agent, or Firm* — Lerner David LLP

(57) ABSTRACT

According to an embodiment of the disclosure, a vial cap is configured for sealing attachment to a tube set and to a vial having a hollow interior configured for receiving and storing a liquid sample. The vial cap may comprise an axially extending cylindrical wall and a radially extending cap top disposed within the cylindrical wall, wherein the cap top has an upper surface and a lower surface. The vial cap may include at least two exterior tubes extending upwardly from the upper surface of the cap top, wherein each exterior tube defines a passageway configured to communicate with the tube set. The vial cap may further include at least two interior tubular structures extending downwardly from the lower surface of the cap top, wherein the at least two interior tubular structures each define a passageway configured to communicate with one of the exterior tubes and the hollow interior.

17 Claims, 15 Drawing Sheets

(52) U.S. Cl.
CPC ........ *A61J 1/1425* (2015.05); *B01L 2200/026* (2013.01); *B01L 2200/0605* (2013.01); *B01L 2200/0689* (2013.01); *B01L 2200/085* (2013.01); *B01L 2200/141* (2013.01); *B01L 2300/042* (2013.01); *B01L 2300/0832* (2013.01)

(58) Field of Classification Search
USPC ..................................................... 435/307.1
See application file for complete search history.

(56) References Cited

U.S. PATENT DOCUMENTS

| | | | |
|---|---|---|---|
| 5,711,446 | A | 1/1998 | Jeffs et al. |
| 5,715,686 | A | 2/1998 | Arav |
| 5,782,383 | A | 7/1998 | Robinson |
| 6,012,596 | A | 1/2000 | Oglesbee et al. |
| 6,056,731 | A | 5/2000 | Koetke et al. |
| 6,139,802 | A | 10/2000 | Niermann et al. |
| 6,350,415 | B1 | 2/2002 | Niermann et al. |
| 6,626,309 | B1 | 9/2003 | Jansen et al. |
| 6,669,060 | B2 | 12/2003 | De Laforcade |
| 6,758,364 | B1 | 7/2004 | Röhrig |
| 6,837,400 | B2 | 1/2005 | Leoncavallo et al. |
| 6,923,337 | B2 | 8/2005 | Hession et al. |
| 7,611,502 | B2 | 11/2009 | Daly |
| 7,870,952 | B2 | 1/2011 | Fontana |
| 7,896,155 | B2 | 3/2011 | Seelhofer |
| 8,168,138 | B2 | 5/2012 | Che et al. |
| 8,357,136 | B2 | 1/2013 | Daly |
| 8,464,633 | B2 | 1/2013 | Anson et al. |
| 8,454,498 | B2 | 6/2013 | Cushner et al. |
| 8,480,570 | B2 | 7/2013 | Tinkham et al. |
| 8,603,417 | B2 | 12/2013 | Cefaratti |
| 9,045,269 | B2 | 1/2015 | Frutin |
| 9,056,702 | B2 | 1/2015 | Hatalla |
| 9,144,373 | B2 | 9/2015 | Kaye et al. |
| 9,408,455 | B2 | 8/2016 | Py |
| 9,414,742 | B2 | 8/2016 | Sato |
| 9,560,954 | B2 | 2/2017 | Jacobs et al. |
| 9,587,215 | B2 | 3/2017 | Mao et al. |
| 9,707,348 | B2 | 7/2017 | Anderson et al. |
| 9,718,074 | B2 | 8/2017 | Deng et al. |
| 9,834,343 | B2 | 12/2017 | Beltrami |
| 9,907,454 | B2 | 3/2018 | Cushner et al. |
| 10,098,525 | B2 | 10/2018 | Maurice |
| 10,271,543 | B2 | 4/2019 | Woods |
| 10,322,859 | B2 | 6/2019 | Gaillot et al. |
| 10,358,272 | B2 | 7/2019 | Brotzel et al. |
| 10,456,014 | B2 | 10/2019 | Wolcott et al. |
| 10,470,648 | B2 | 11/2019 | Adams et al. |
| 2005/0194343 | A1* | 9/2005 | Sprishen ............ B65D 41/0421 215/354 |
| 2007/0235105 | A1 | 10/2007 | Ramsey et al. |
| 2009/0148934 | A1 | 6/2009 | Woods et al. |
| 2009/0321382 | A1 | 12/2009 | Fontana |
| 2012/0018318 | A1 | 1/2012 | Otsuka et al. |
| 2012/0067459 | A1 | 3/2012 | Kunishige et al. |
| 2014/0151322 | A1 | 6/2014 | Bahri et al. |
| 2014/0316204 | A1 | 10/2014 | Ofir et al. |
| 2015/0320638 | A1 | 11/2015 | Becker et al. |
| 2017/0273672 | A1 | 9/2017 | Wiegerinck et al. |
| 2017/0280976 | A1 | 10/2017 | Roberts |
| 2018/0242573 | A1 | 8/2018 | Lacey et al. |
| 2018/0333688 | A1 | 11/2018 | Lee |
| 2018/0353954 | A1* | 12/2018 | Pennie .................. B04B 5/0442 |
| 2019/0090725 | A1 | 3/2019 | Roberts |
| 2019/0100747 | A1 | 4/2019 | Ismagilov et al. |
| 2019/0110665 | A1 | 4/2019 | Mann et al. |
| 2019/0117046 | A1 | 4/2019 | Briggs |
| 2019/0175447 | A1 | 6/2019 | Wise et al. |

FOREIGN PATENT DOCUMENTS

| | | |
|---|---|---|
| EP | 2190401 | 5/2015 |
| EP | 2183610 | 3/2016 |
| WO | 2013056623 | 4/2013 |
| WO | 2016016886 | 2/2016 |
| WO | 2019084371 | 5/2019 |

* cited by examiner

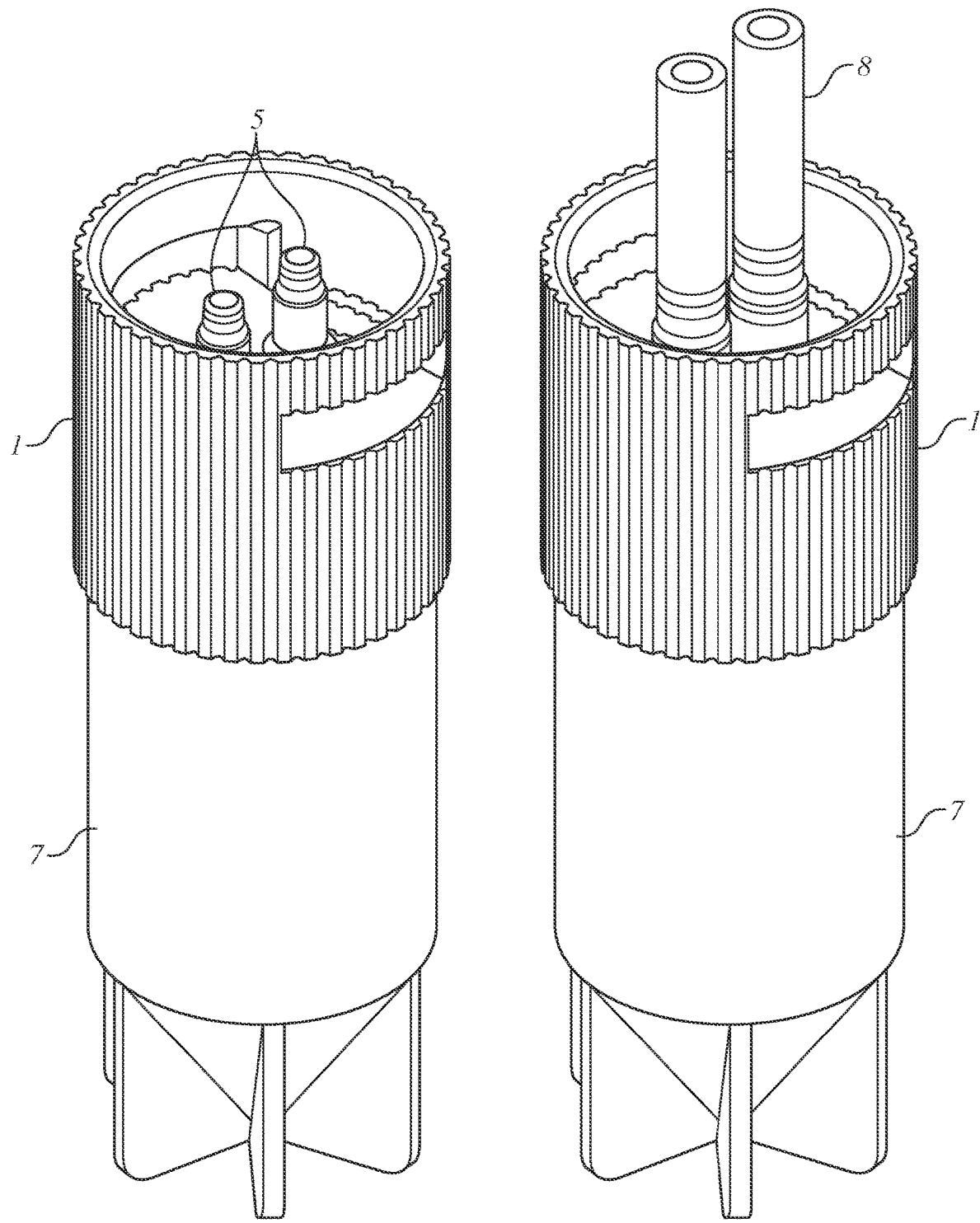
*FIG. 4A*    *FIG. 4B*

NEEDLE-LESS ACCESS VIAL AND CAP FOR THE ASEPTIC SAMPLING AND STORAGE OF LIQUIDS

BACKGROUND OF THE DISCLOSURE

Processing of biological cells and other liquids that require sterility often requires that processing to occur in aseptically closed systems. These aseptically closed systems may comprise of interconnected tubes and bags for instance. Small samples of the biological or other fluid are often required for quality control QC to check the process is working, or to check process parameters such as cell viability, cell count or that sterility has not been breached and the product contaminated or compromised in some way. These samples need to be taken in a manner that does not breach the sterility of the aseptically closed system, allowing the sample to be aseptically separated from the closed system and taken away for testing. Often these samples need to undergo cryogenic storage to allow for testing of the sample at a later date.

SUMMARY

According to an embodiment of the disclosure, a vial cap is configured for sealing attachment to a tube set and to a vial having a hollow interior configured for receiving and storing a liquid sample. The vial cap may comprise an axially extending cylindrical wall and a radially extending cap top disposed within the cylindrical wall, wherein the cap top has an upper surface and a lower surface. The vial cap may include at least two exterior tubes extending from the the cap top, wherein each exterior tube defines a passageway configured to communicate with the tube set. The vial cap may further include at least two interior tubular structures extending downwardly from the lower surface of the cap top, wherein the at least two interior tubular structures each define a passageway configured to communicate with one of the exterior tubes and the hollow interior of the vial.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 4A is a top, perspective view of a vial cap attached to a vial.

FIG. 4B is a top, perspective view of a vial cap attached to a vial attached to a tube set.

Figure 1B:
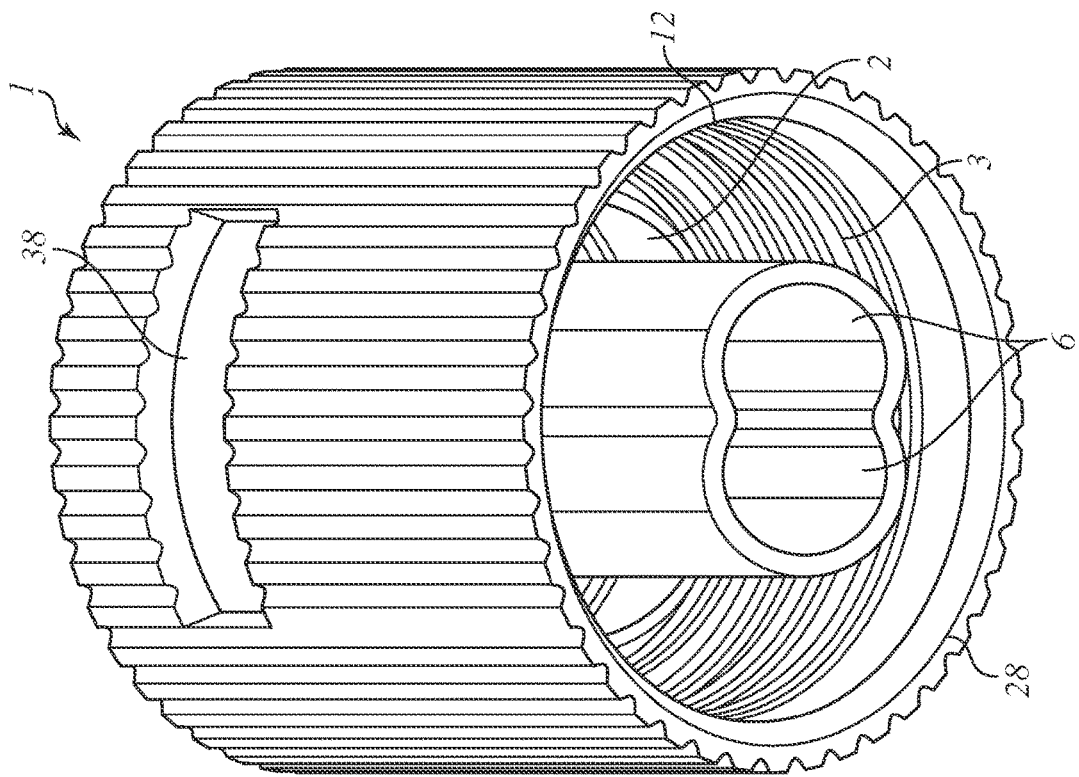
FIG. 1B is a bottom, perspective view of the vial cap of FIG. 1A.
Figure 1A:
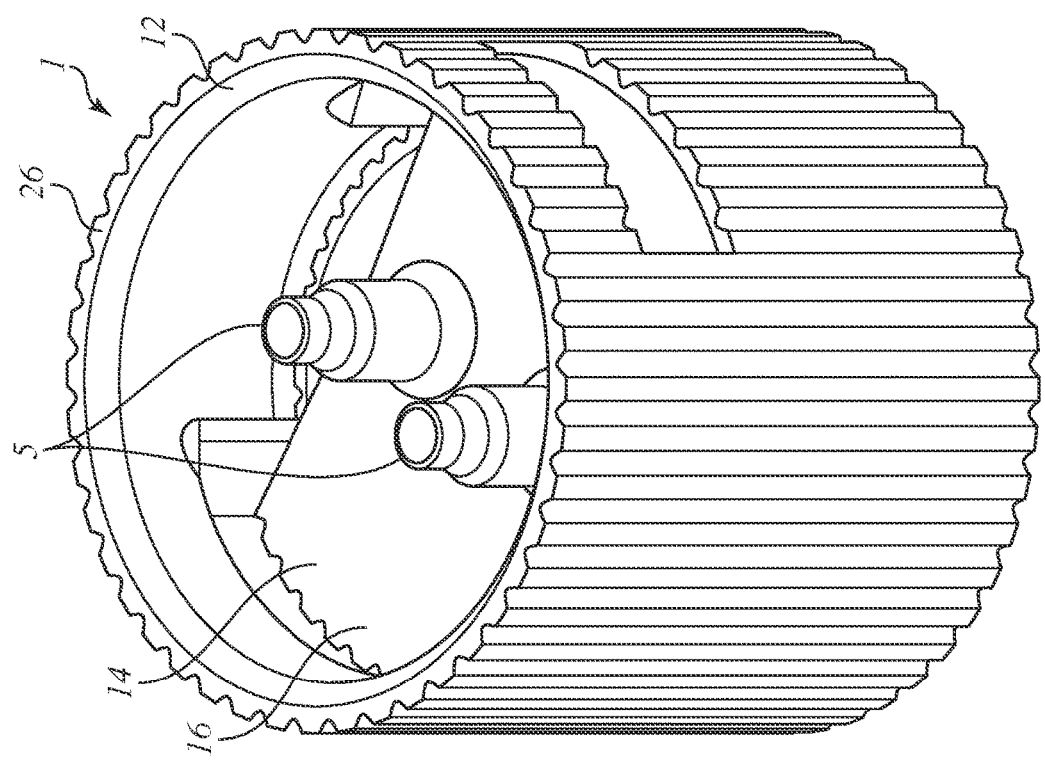
FIG. 1A is a top, perspective view of a vial cap according to an embodiment of the disclosure.
Figure 2:
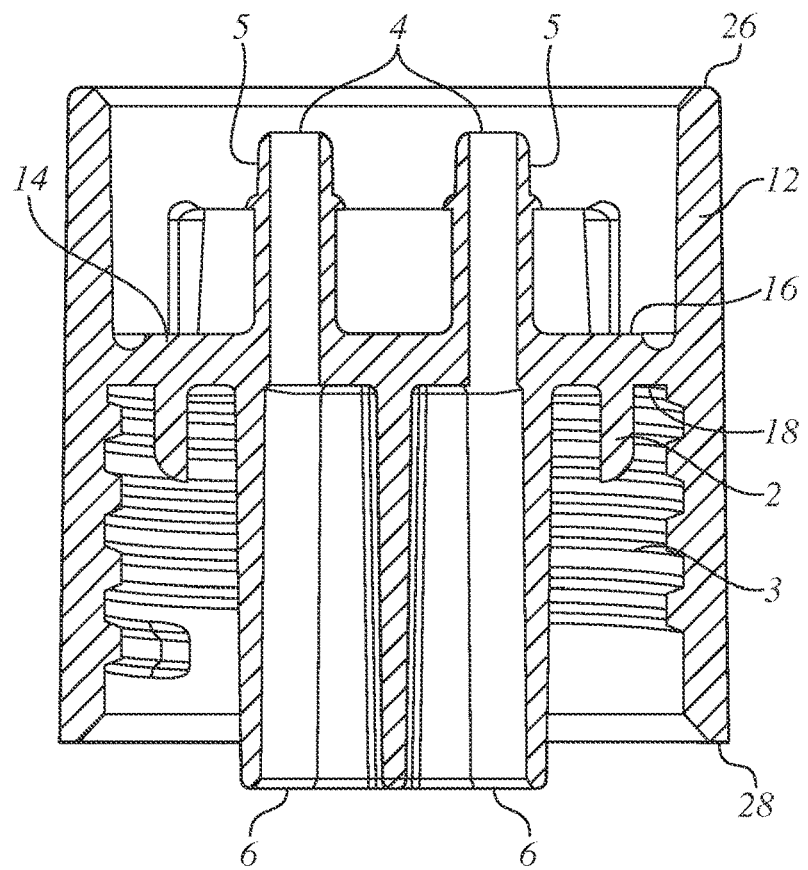
FIG. 2 is a cross-sectional view of the vial cap of FIG. 1A.
Figure 3:
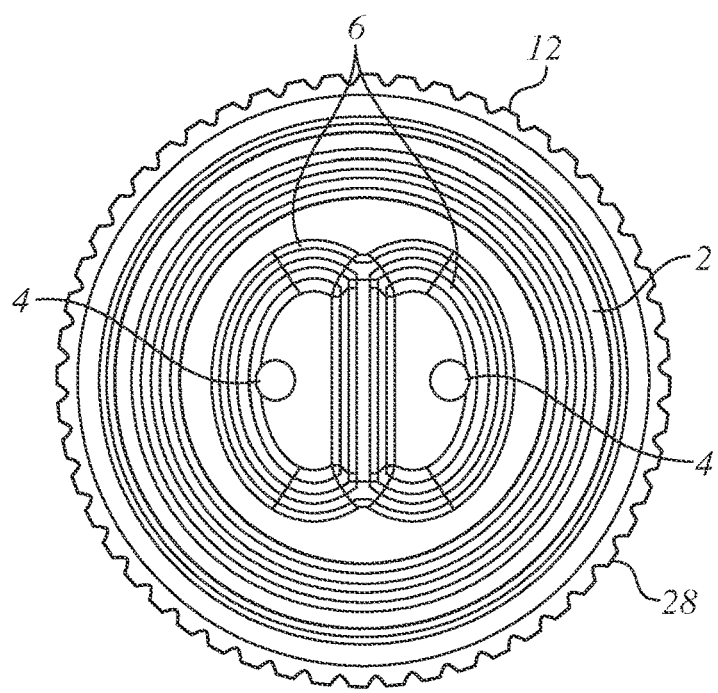
FIG. 3 is a bottom view of the vial cap of FIG. 1A.
Figures 5A, 5B:
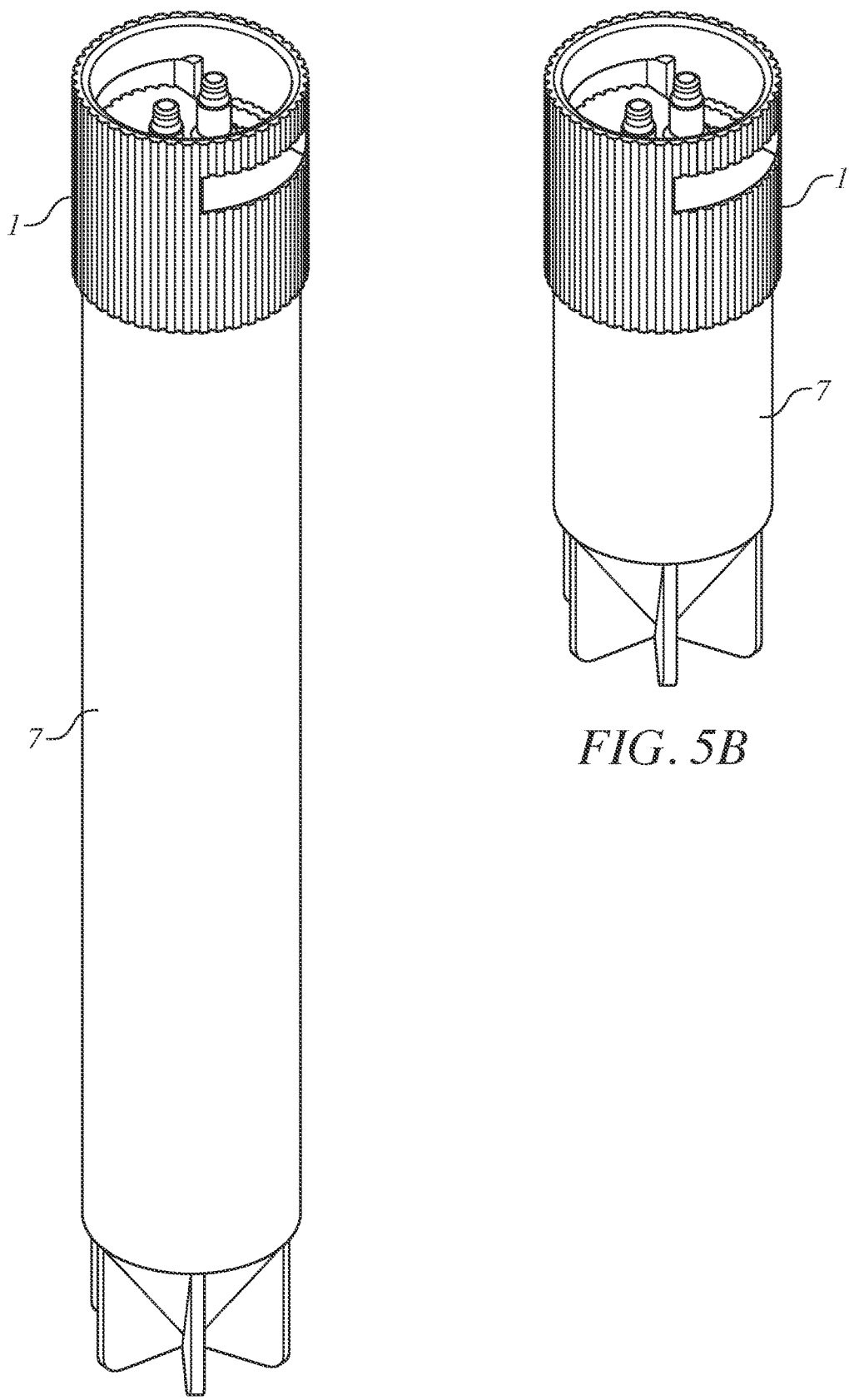
FIGS. 5A and 5B are top, perspective views of a vial cap attached to vials showing different sizes of vials with the vial in FIG. 5A being larger than the vial in FIG. 5B.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The problem with existing sampling vessels is that after they have been filled with liquid sample and aseptically separated, it can be difficult or impossible to access the sample for testing without the use of a sharp implement like a syringe, scissors or a knife. The use of sharp implements to access the sample poses a health and safety risk to the user as the sharp implement can easily cut and penetrate PPE personal protective equipment and the users own skin. The sharp may also be contaminated with the biological liquid at the time of piercing the user's skin which could lead to infection, illness or death of the user.

Embodiments of the disclosure solve this problem by removing the use of sharp implements in the access of the samples collected by this invention, whilst still providing the functionality for the collection, aseptic separation and possible cryogenic storage of the sample.

Another problem in taking samples of biological and other liquids in aseptically closed systems is the accuracy of the volume of liquid taken. These liquids are often quite valuable not just because they are expensive to process, but they are often part of a therapy used to cure a patient from a disease or illness. Volume taken for sampling is volume of therapy that the patient does not receive. Hence the sample volumes are often small and need to have their volume controlled/measured accurately to reduce waste but ensure sufficient volume for the test. Embodiments of the disclosure incorporate features to provide repeatable capture of correct volumes of liquid for sampling.

A further problem with some sampling vessels is that they are not suitable or reliable in low temperature or cryogenic storage of the sample. Low temperature or cryogenic storage can cause seals to fail, breaching sterility and allowing the ingress of gasses that can cause catastrophic failure during thawing of the product. Also, cryogenic storage can require the use of liquids like dimethyl sulfoxide (DMSO) that can cause degradation of the sample vessel if materials are not chemically compatible. Embodiments of the disclosure address these seal integrity problems by geometry to assist in controlling gas volumes during filling and therefore pressures during freezing, in additional to using materials with sufficient compatibility with DMSO and closely matched shrinkage properties.

Embodiments of the disclosure provide the metered capture of fluid samples from closed tube-sets in a small vessel or vial. For example, this vial could be used to capture small samples for the purpose of Quality Control (QC) checks of a biological process. Once detached from the tube-set, embodiments of the disclosure allow access to the sample without the use of needles or sharp implements via the action of a screw cap. Embodiments of the disclosure provide for aseptic disconnection from the tube-set. Certain embodiments provide for aseptic sealing of the vessel during disconnection to maintain sterility of the fluid inside the vessel. Certain embodiments provide for seal integrity across typical lab and processing temperatures including cryogenic storage.

Figure 6:
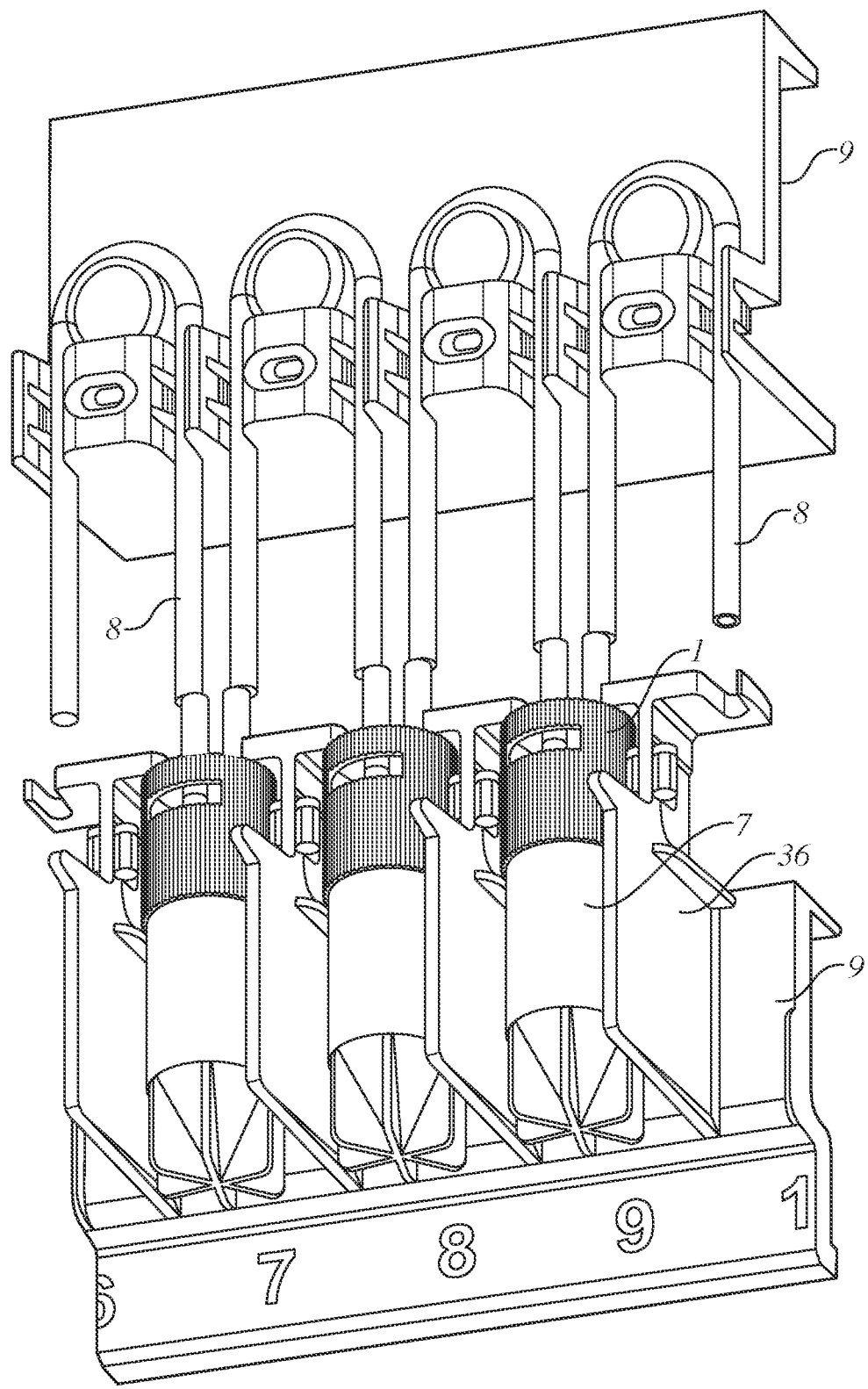
FIG. 6 is bottom, perspective view of a fluidic system including structure for holding vials with attached vial caps and tube sets.
Figure 7:
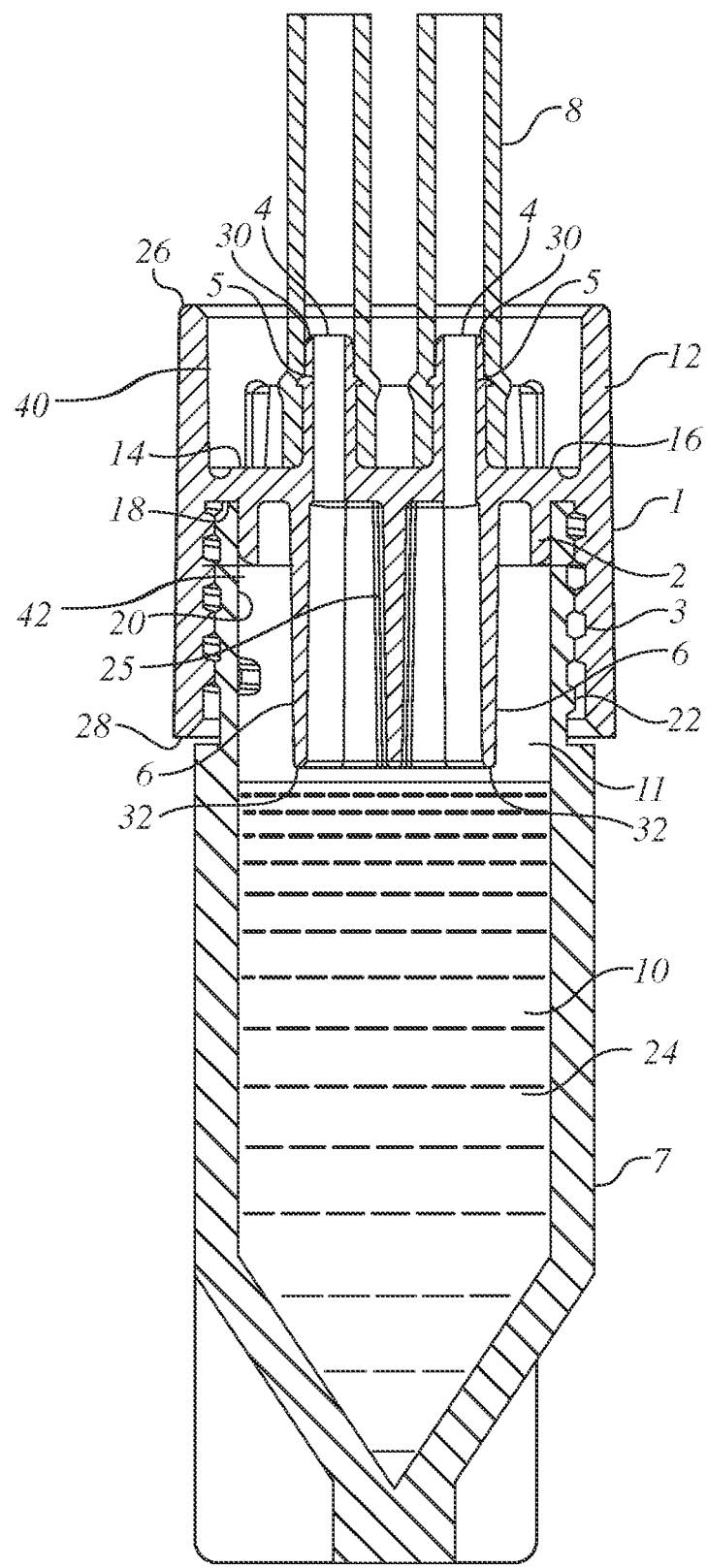
FIG. 7 is a cross-sectional view of a vial, a tube set and a vial cap having an internal thread and a cylindrical plug seal.

Embodiments of a needle-less vial cap which can be attached to a vial or other vessel for aseptic sampling and storage of liquids within the vial are shown in FIGS. 1-16, wherein a first embodiment is shown in FIGS. 1-7 and alternative embodiments are shown in FIGS. 8-16. Referring to FIGS. 1A-7, the vial cap 1 comprises an axially extending cylindrical wall 12, and a radially extending cap top 14 disposed within cylindrical wall 12 and having an upper surface 16 and a lower surface 18 dividing the vial cap 1 into an upper interior portion 40 and a lower interior portion 42. The vial cap 1 further has a seal, for example a cylindrical plug seal 2, configured to create a gas tight seal to a container, vessel or vial 7 even under cryogenic conditions (FIG. 7). Specifically, the cylindrical plug seal 2 is cylindrically-shaped, extends downwardly from the lower surface 18 of the cap top 14 and is concentrically oriented with and internally spaced from the cylindrical wall 12. The cylindrical plug seal 2 provides a seal with an internal cylindrical surface 20 of the vial 7. The vial cap 1 may also have a screw thread 3, such as on an internal surface of cylindrical wall 12 of vial cap 1, configured to provide a mechanical connection to the vial 7 by threading onto a corresponding external threaded surface 22 of the vial 7 such that an open end of the vial 7 is trapped and sealed against the cylindrical plug seal 2. The vial 7 may have a hollow interior 24 configured to receive and store a liquid and/or gas.

Additional alternative connections and seals between vial caps and vials are shown in FIGS. 8-14B.

Figure 8:
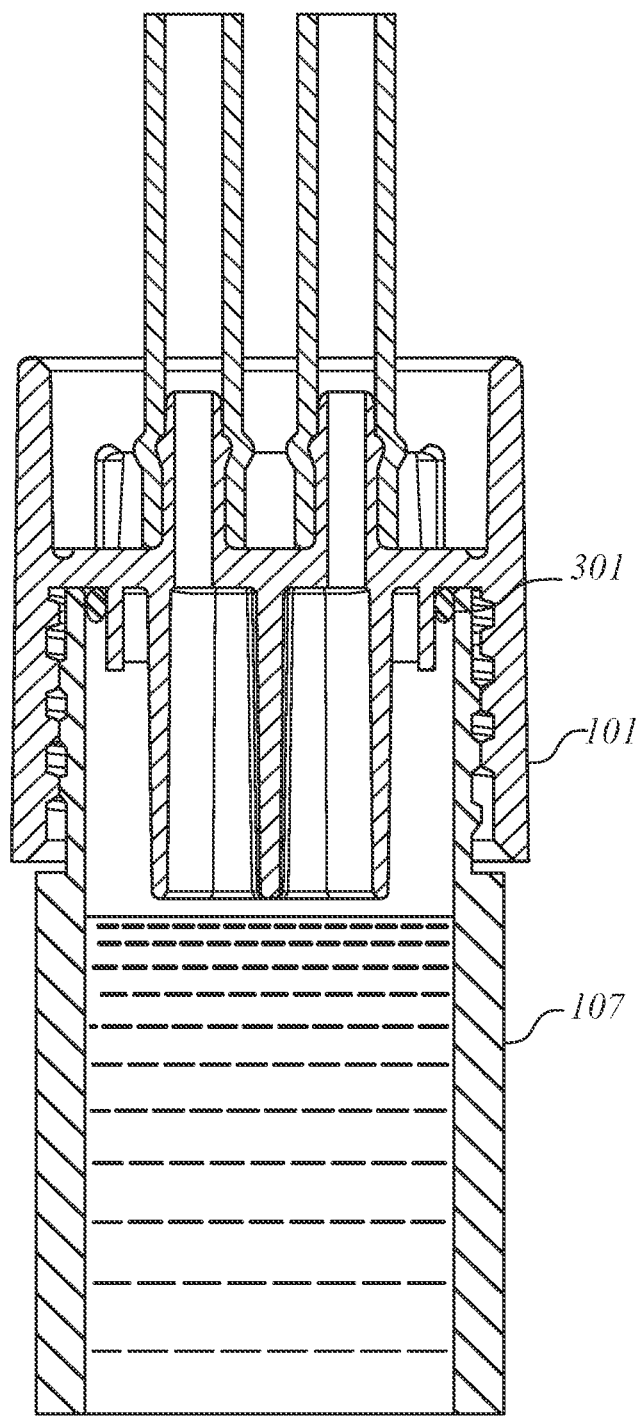
FIG. 8 is a partial cross-sectional view of a vial, a tube set and a vial cap having an internal O-ring according to another embodiment.

Referring to FIG. 8, a vial cap 101 and vial 107 may have an internal O-ring seal 102 sealing the connection between the vial cap 101 and vial 107.

Figure 9:
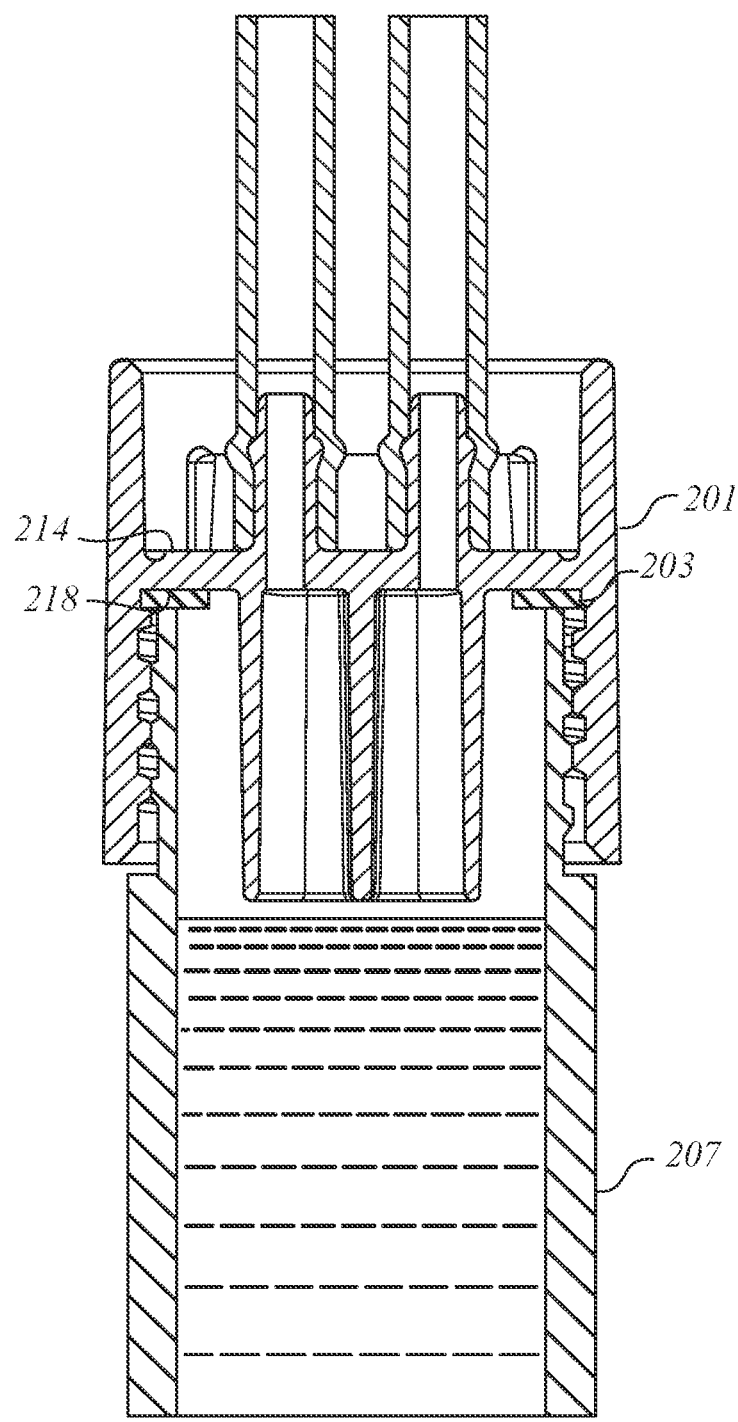
FIG. 9 is a partial cross-sectional view of a vial, a tube set and a vial cap having an internal flat O-ring according to another embodiment.

Referring to FIG. 9, a vial cap 201 and vial 207 may have an internal flat O-ring seal 202 sealing the connection between the vial cap 201 and vial 207 wherein the internal flat O-ring seal 202 is disposed at an upper surface of the vial 207 and a lower surface 218 of cap top 214.

Figure 10:
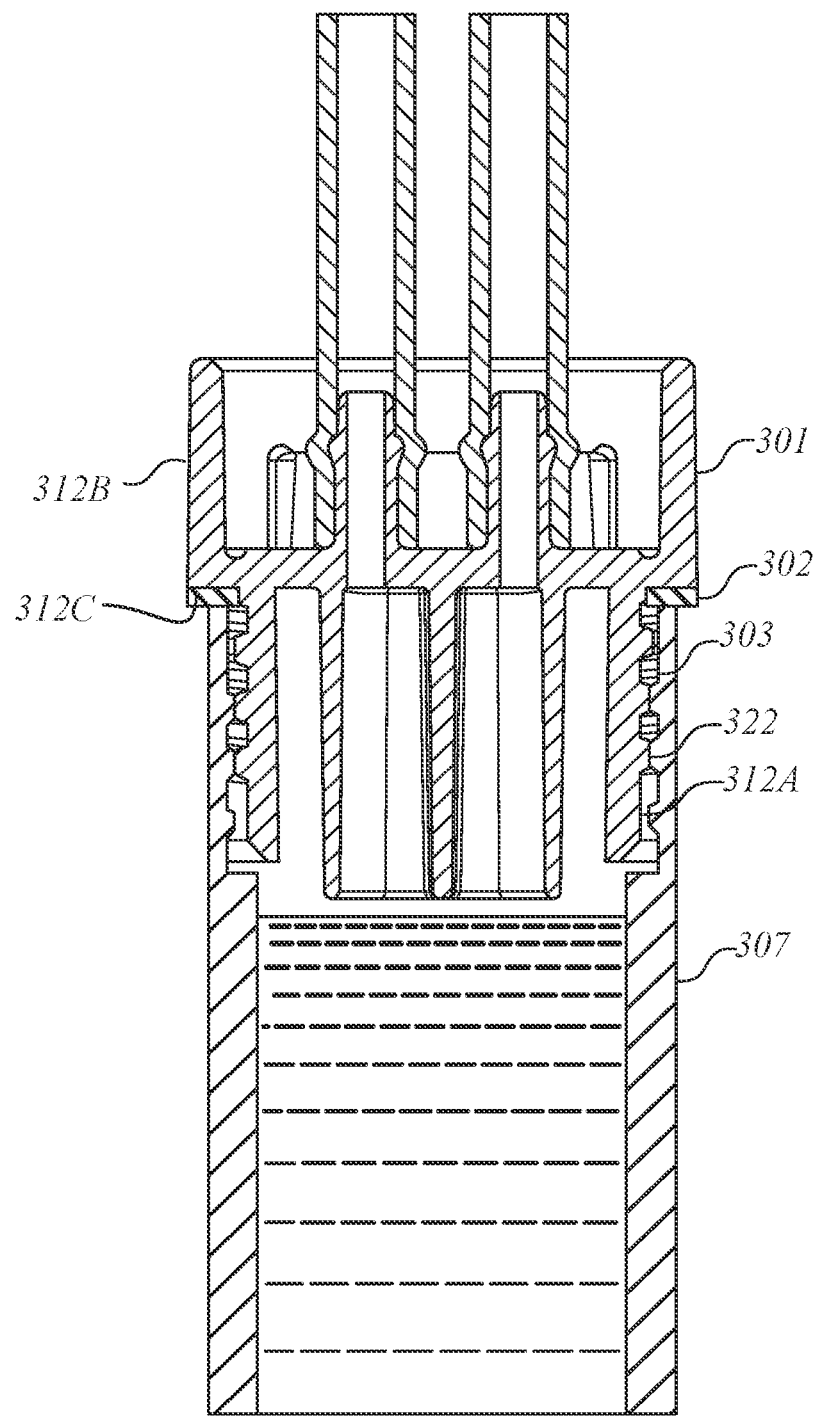
FIG. 10 is a partial cross-sectional view of a vial, a tube set and a vial cap having an external thread and an external flat O-ring according to another embodiment.
Figure 11:
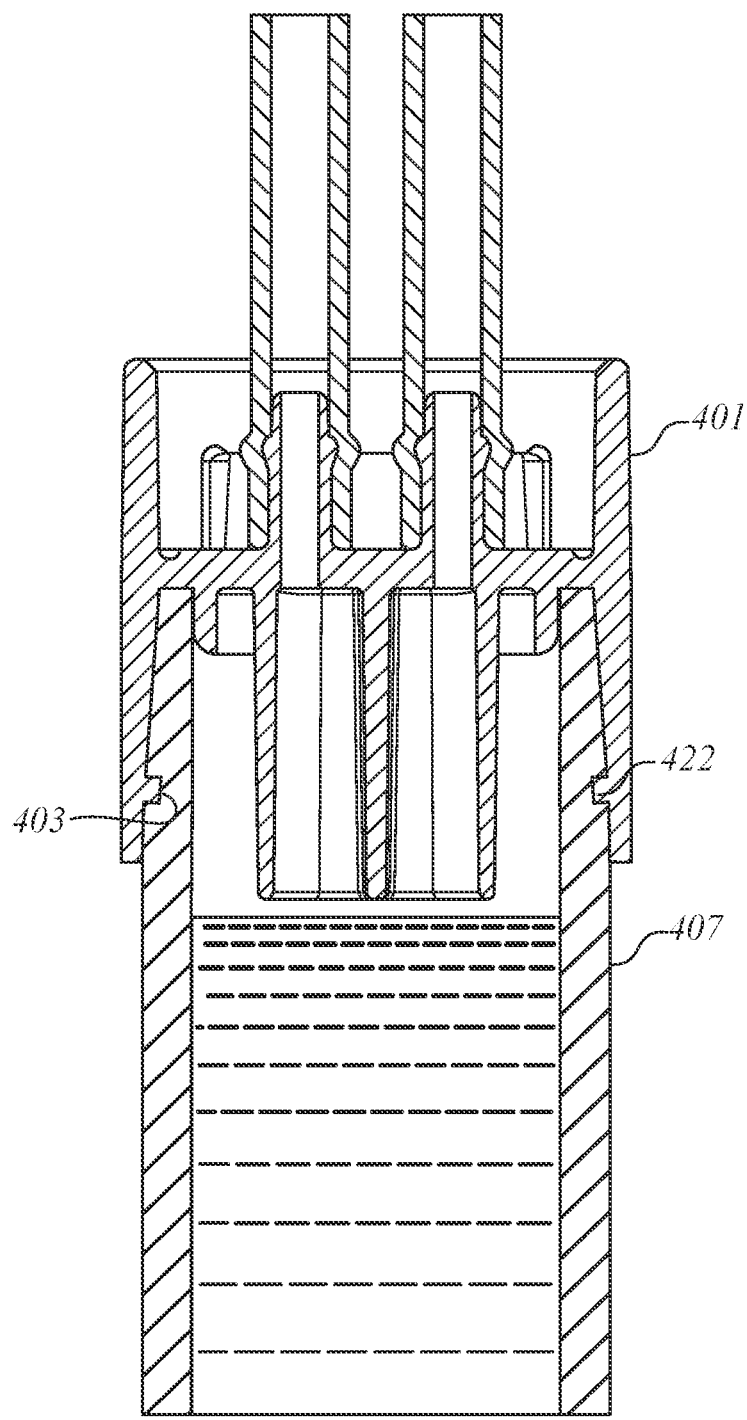
FIG. 11 is a partial cross-sectional view of a vial, a tube set and a vial cap having a snap ring according to another embodiment.

Alternatively, as shown in FIG. 10, a connection between a vial cap 301 and a vial 307 may be formed by a screw thread 303 on an external surface of a lower cylindrical wall 312A of the vial cap 101 configured to connect to an internal threaded surface 322 of the vial 307. The embodiment of FIG. 10 further has a seal in the form of a flat O-ring seal 302 between an upper surface of the vial 307 and a bottom shelf 312C beneath an upper cylindrical wall of 312B, wherein the upper cylindrical wall of 312B has a diameter larger than diameter of the lower cylindrical wall 312A, Referring to FIG. 11, the connection between a vial cap 401 and a vial 407 comprises an inwardly projecting snap ring 403 on vial cap 401 which is configured to engage a corresponding groove 422 on an exterior surface of vial 407.

Figure 12:
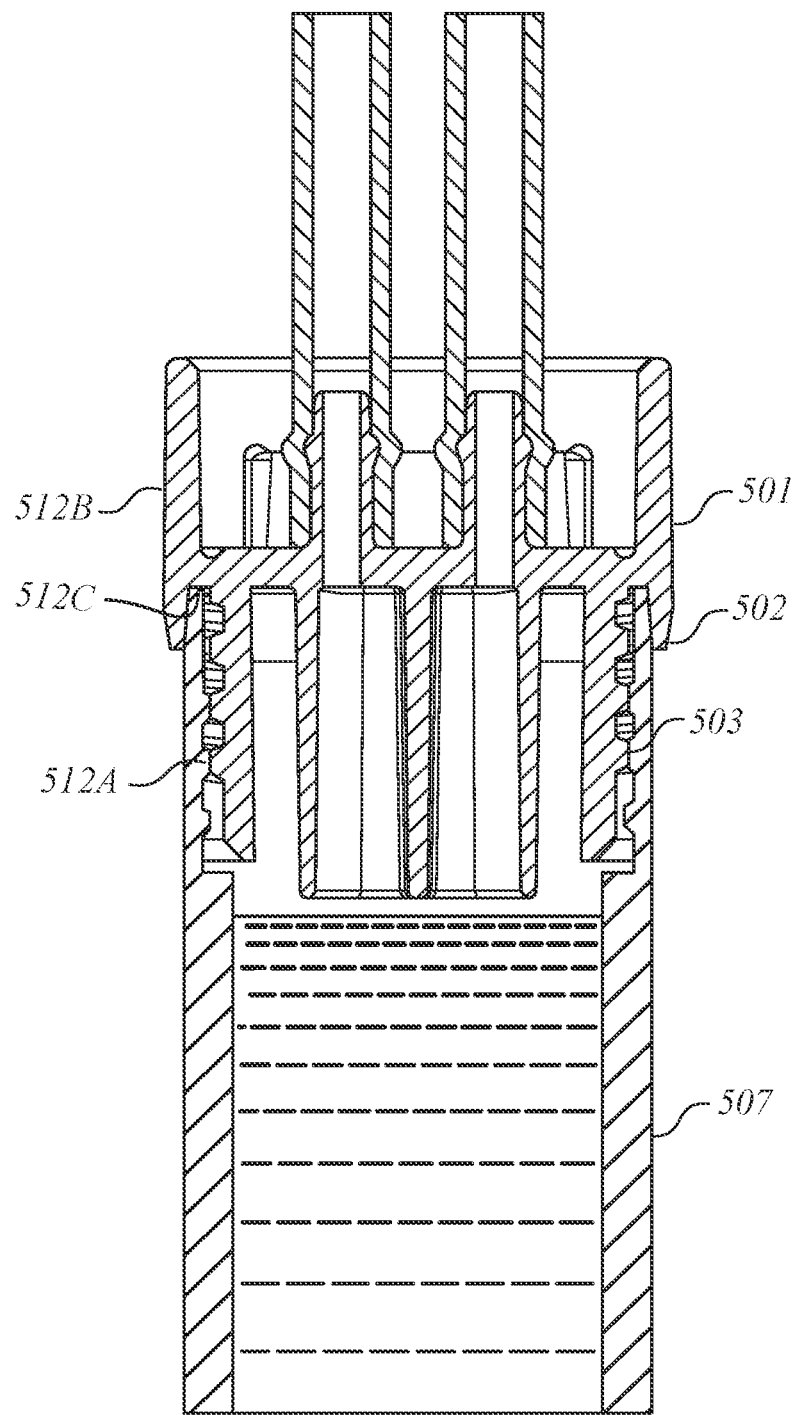
FIG. 12 is a partial cross-sectional view of a vial, a tube set and a vial cap having an external plug or interference type seal according to another embodiment.

Referring to FIG. 12, the connection between a vial cap 501 and a vial 507 comprises a screw thread 503 on an external surface on a lower cylindrical wall 512A of the vial cap 501 like FIG. 10. A seal is formed by an external cylindrical plug seal 502 extending from an upper cylindrical wall 512B, wherein the upper cylindrical wall of 512B has a diameter larger than diameter of the lower cylindrical wall 512A, and the upper surface of vial 507 engages a bottom shelf 512C between upper cylindrical wall of 512B and lower cylindrical wall of 512A.

Figure 13:
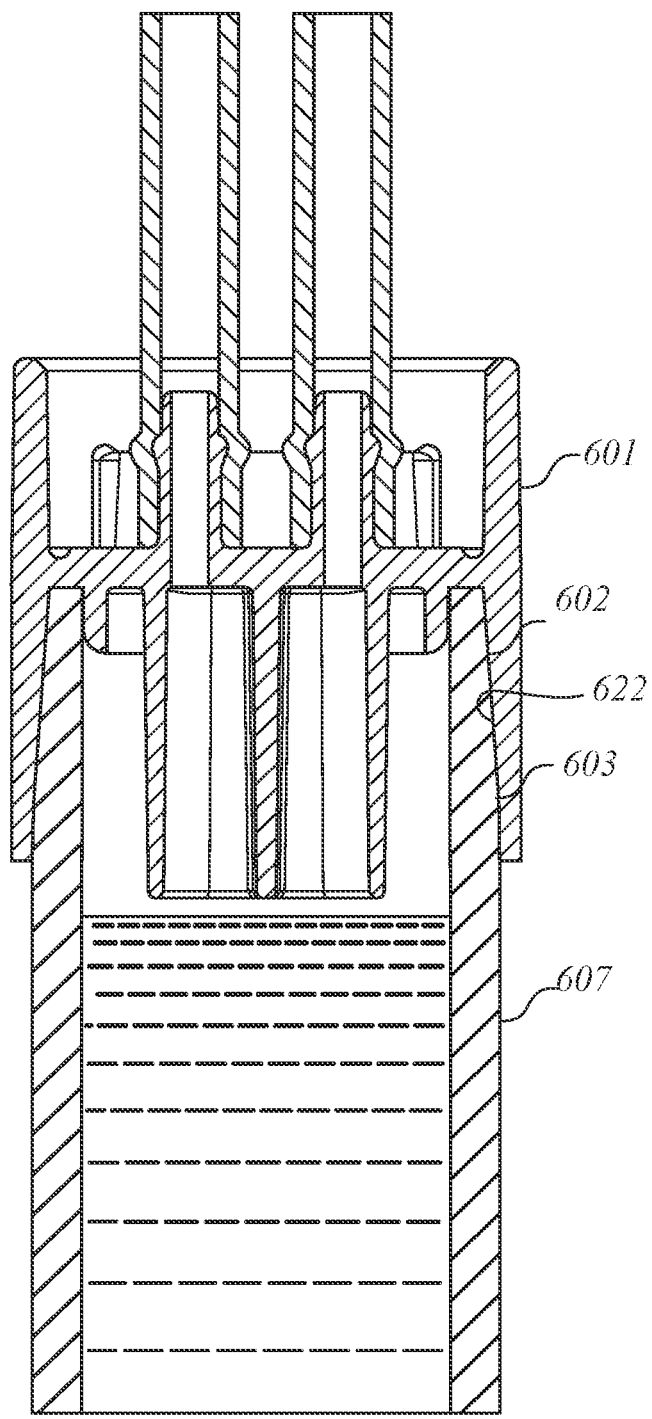
FIG. 13 is a partial cross-sectional view of a vial, a tube set and a vial cap having a friction/push taper seal according to another embodiment.

Referring to FIG. 13, the connection between a vial cap 601 and a vial 607 comprises a friction/push seal 602 between a tapered external surface 603 on the vial 607 and a corresponding tapered internal surface 622 on the vial cap.

Referring to FIG. 13, the connection between a vial cap 601 and a vial 607 comprises a friction/push seal 602 between a tapered external surface 603 on the vial 607 and a corresponding tapered internal surface 622 on the vial cap.

Figure 14A:
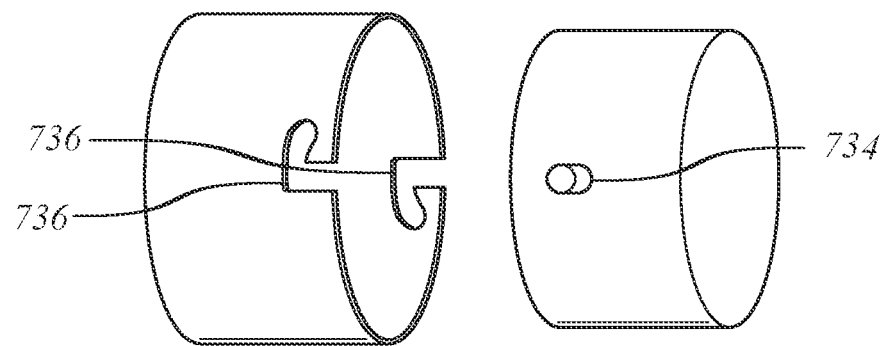
FIGS. 14A and 14B are partial views of example bayonet type connections between vial caps and vials according to another embodiment.
Figure 14B:
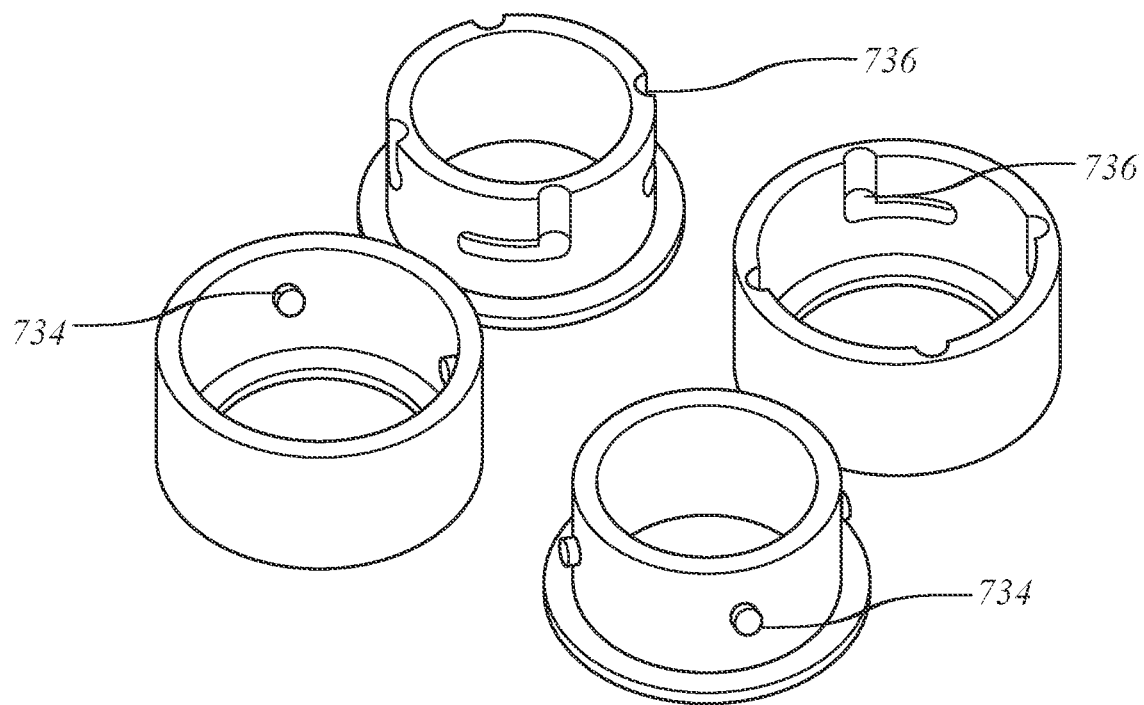

Referring to FIGS. 14A and 14B, partial views of example bayonet type connections between vial caps and vials having corresponding opposed external or internal bayonet projections 734 and opposed shaped external or internal bayonet slots or grooves 736 which couple to each other through engagement and fractional turning of a projection 734 within a slot or groove 736 which are disposed on the connecting end of the vial caps and vials according to another embodiment are shown.

Referring again to FIGS. 1-7, the vial cap 1 may also have two or more ports 4 in the vial cap 1 that allow entry and exit of a fluid or gas into the hollow interior 24 of the vial 7. One port 4 is typically used as an inlet for entry of the fluid or gas, whilst the other port 4 is used as an outlet which allows the fluid or gas to flow back out again from the vial 7. The ports 4 may be identical in configuration. It is their connectivity in the fluidic system which determines which port 4 is the inlet and which port is the outlet.

The two or more ports 4 may comprise barbed external tubes or spigots 5 extending from the cap top 14. Ports 4 may extend upwardly from the upper surface 16 of the cap top 14 and may be configured to allow for connection to tube sets 8 for the fluid connectivity of fluid passageways therein to the fluidic system. The ports 4 may be further configured as two internal tubular structures, or chimneys 6 that extend downwardly from the lower surface 18 of the cap top 14 creating an internal divide or fluidic separator 25 between the ports 4 and are configured as interior fluidic passageways between the external tubes 5 and the hollow interior 24 of the vial 7. The chimneys 6 ensure that the liquid entering from the inlet port 4 fills the vial 7 before entering and leaving through the outlet port 4. When the liquid is followed by a gas, the gas pushes liquid out of the chimneys 6, but leaves liquid below the chimneys 6 in the vial 7 (FIG. 7). This creates a metered volume of liquid 10 remaining in the vial 7, and a metered gas head volume 11 to allow for expansion of the liquid during the freezing process.

Figure 15A:
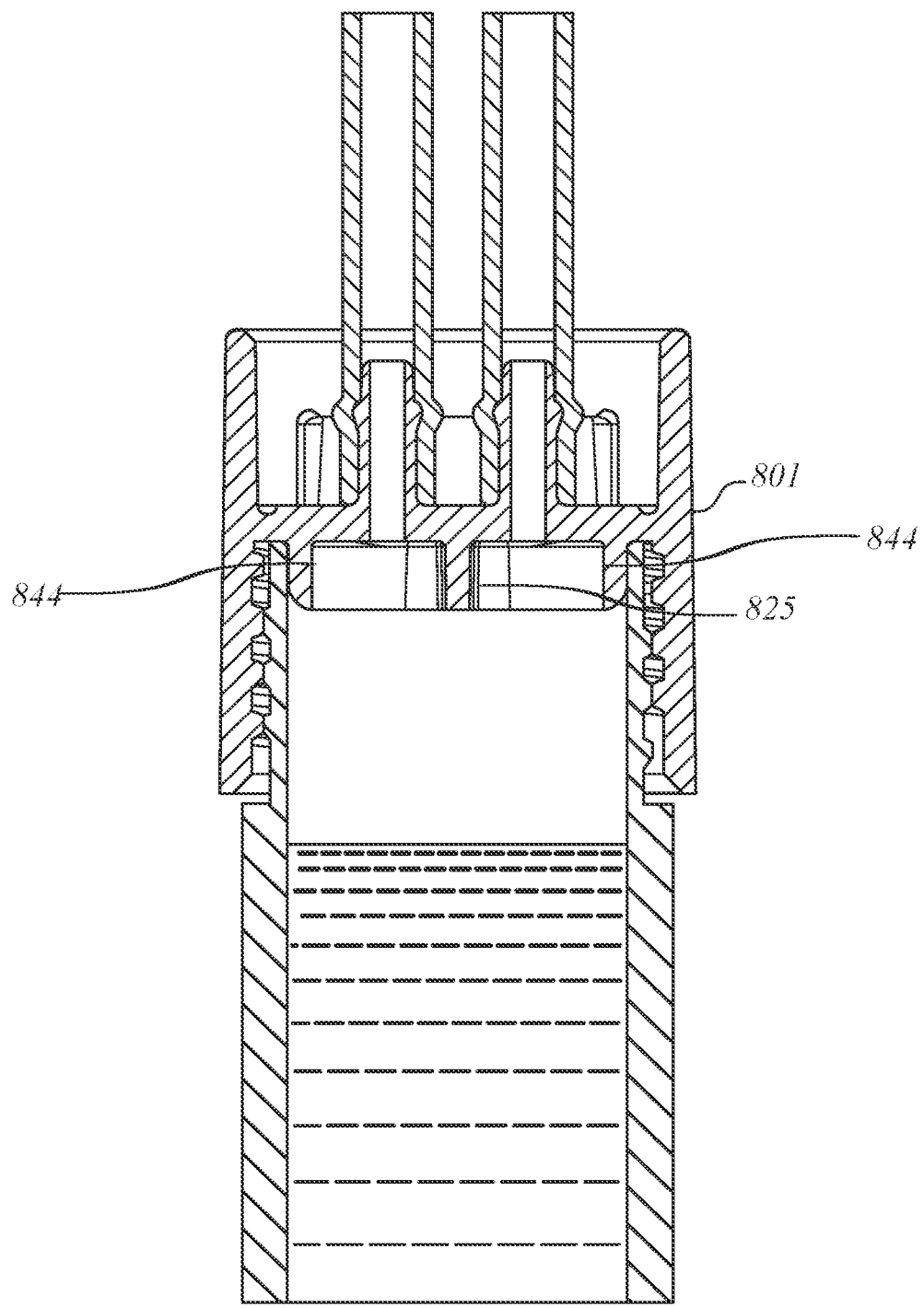
FIG. 15A is a partial cross-sectional view of a vial, a tube set and a vial cap having an internal dividing wall according to another embodiment.
Figure 15B:
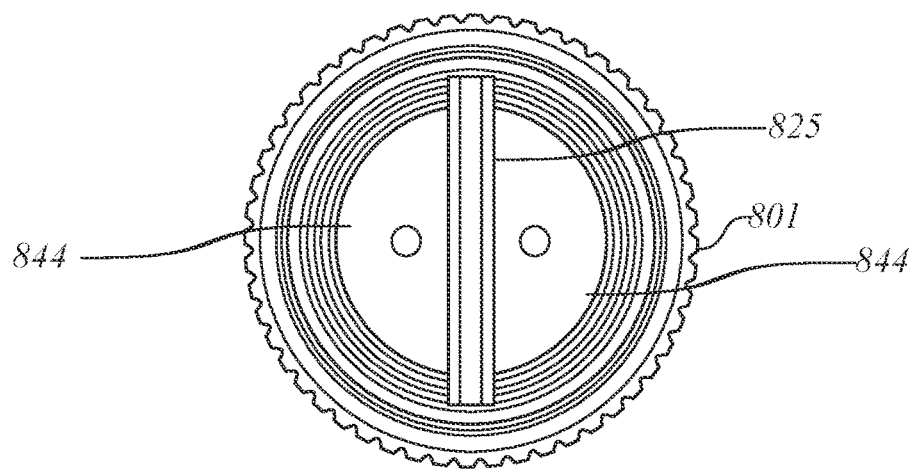
FIG. 15B is a bottom view of the vial cap of FIG. 15A.

An alternative embodiment of a vial cap 801 is shown in FIGS. 15A and 15B having a fluidic separator 825 extending across the internal diameter of vial cap 801 instead of two internal tubular structures or chimneys. Fluidic separator 825 separates the internal portion of vial cap 801 into two interior fluidic passageways 844 and provides the same metering function that the two internal tubular structures or chimneys discussed above does.

Referring again to FIGS. 1-7, in some embodiments, the cap top 14 is disposed at the fluid connection of the external tubes 5 and the chimneys 6 and is spaced from an upper edge 26 and a lower edge 28 of the cylindrical wall 12. External tubes 5 may extend upwardly from the upper surface 16 of the cap top 14 such that the external tubes 5 are disposed within the cylindrical wall 12 and upper ends 30 thereof are spaced below the upper edge 26 of the cylindrical wall 12 in order to protect external tubes 5 from side loading and breakage.

Figure 16:
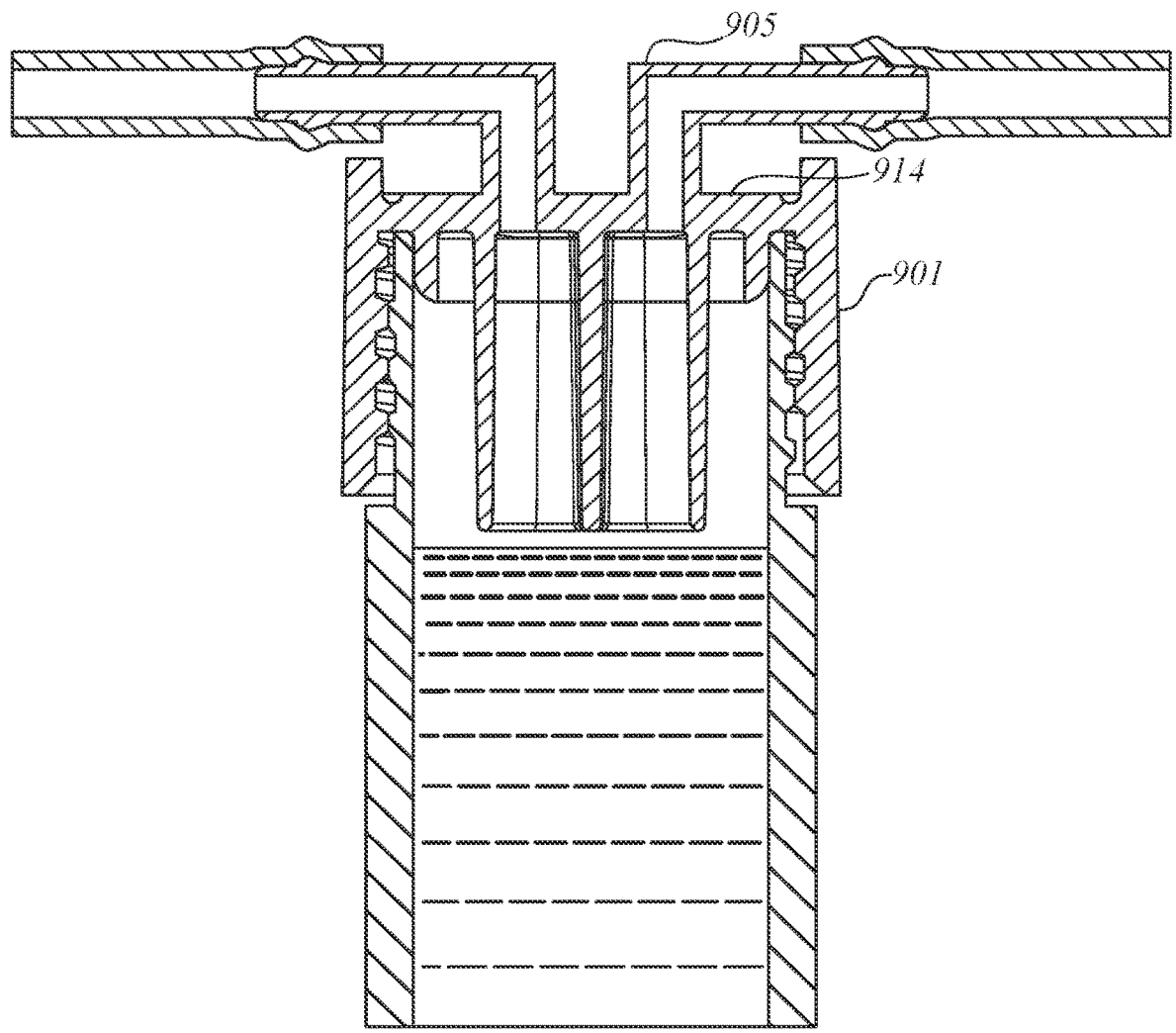
FIG. 16 is a partial cross-sectional view of a vial, a tube set and a vial cap having radial ports according to another embodiment.

An alternative embodiment of a vial cap 901 is shown in FIG. 16 in which external tubes 905 extend upwardly and then radially from cap top 914.

Referring again to FIGS. 1-7, chimneys 6 may extend downwardly from the lower surface 18 of cap top 14 such that the chimneys 6 are disposed within the cylindrical wall 12 and lower ends 32 thereof extend past the lower edge 28 of the cylindrical wall 12. Alternatively, the lower ends 32 may end before the lower edge 28 of the cylindrical wall as the lengths of chimneys 6 may be tuned to define the trapped volume in the vial 7. The chimneys 6 may be joined along their entire lengths so that they are configured to fit in a small space while meeting good injection molded part design principals.

Referring to FIG. 6, a fluidic system including a structure or frame 9 for holding vials 7 with attached vial caps 1 and tube sets 8. Frame 9 may be a plastic disposable frame 9 which 1) holds the vials 7/vial caps 1 and tube set 8 so that they are easier to handle, and 2) allows the tubes of the tube sets 8 to straddle an automated tube seal and separate device, allowing the vials to be aseptically sealed and removed. Alternatively, a manual tube seal and separate device may be used. The vials 7/vial caps 1 are only held lightly by the frame 9 to allow easy removal once they have been sealed and separated from the tube set 8. Walls 36 that separate the vials 7, may also be used as an aide for the application of labels to the vials bodies which is difficult to do with gloved hands in a clean room environment. It should be noted that FIG. 6 shows a portion of a full frame 9.

The vial caps 1 may further comprise at least one window 38 disposed through axially extending cylindrical wall 12. The windows 38 may be rectangular in shape and are configured to allow for the manufacture, or injection molding, of the vial cap 1. Parts of the injection molding tooling, called sliders (not shown), slide in/out of these windows 38 to form the undercut of the barbed ports 4. Where the sliders move in and out over the cap top 14, the surface is slightly tapered.

Embodiments of the disclosure are not limited to the above described embodiments. For example, some embodiments have more ports. In some embodiments, the vial cap may be composed of plastic or other materials such as other polymers or metals. In some embodiments the tube set may comprise plastic or other suitable materials. Some embodiments may have other attachment methods such as a vial cap welded on, snapped on, glued on or pushed on. Some embodiments have other access methods such as flip top lid, tear open lid, pop off/snap off lid, pull out lid or multiple access such as a cap on top and bottom of vial. Some embodiments may include other metering such as without chimneys, chimneys of different lengths or shapes. Some embodiments may include other tubing connections such as without barbs, welded on, solvent bonded or overmolded. Some embodiments may be configured for different sizes and screw threads to suit other types/sizes of vessels. Some embodiments may use dissimilar materials between vial cap and vial with different shrinkage rates.

Thus, embodiments of the disclosure allow access to the captured sample without the need for sharp implements like needles. Sharp implements like needles present a safety risk to users and a risk of sterility breach for aseptic processes. Embodiments of the disclosure provide access to the liquid sample simply by unscrewing the vial cap, or via tube welding. Certain embodiments can be used to capture small metered volumes from a fluidic tubing system. For example, embodiments can be used for capturing quality control QC samples, capturing sterility samples, capturing samples for storage cryogenic or other for future testing and assessment or creating aliquots of a larger sample.

All of the features disclosed in this specification including the references incorporated by reference, including any accompanying claims, abstract and drawings, and/or all of the steps of any method or process so disclosed, may be combined in any combination, except combinations where at least some of such features and/or steps are mutually exclusive.

Each feature disclosed in this specification including references incorporated by reference, any accompanying claims, abstract and drawings may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments. The invention extends to any novel one, or any novel combination, of the features disclosed in this specification including any incorporated by reference references, any accompanying claims, abstract and drawings, or to any novel one, or any novel combination, of the steps of any method or process so disclosed. The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A container cap configured for sealing connection to a tube set and to a container having a hollow interior configured for receiving and storing a liquid sample, the container cap comprising:
   an axially extending cylindrical wall;
   a radially extending cap top disposed within the cylindrical wall, wherein the cap top has an upper surface and a lower surface, wherein the cap top divides the container cap into an upper interior portion within the cylindrical wall above the upper surface of the cap top, and a lower interior portion within the cylindrical wall and below the lower surface of the cap top; and
   at least two exterior tubes extending from the cap top, wherein each exterior tube defines an exterior fluidic passageway configured to fluidly connect to the tube set; and
      wherein the lower interior portion comprises at least one fluidic separator extending downwardly from the lower surface of the cap top, wherein the at least one fluidic separator defines at least two interior fluidic passageways each configured to fluidly connect to one of the exterior fluidic passageways and to the hollow interior of the container, wherein each interior fluidic passageway is configured to provide a metering of fluid volume within the attached container.

2. The container cap of claim 1, further comprising at least one seal configured to seal a connection between the container cap and the container, wherein the at least one seal comprises at least one of a cylindrical plug seal, an internal O-ring, an external O-ring, an internal flat O-ring, and an external flat O-ring.

3. The container cap of claim 2, wherein the at least one seal comprises a cylindrical plug seal extending downwardly from the lower surface of the cap top and concentrically spaced from the cylindrical wall and internally spaced from the cylindrical wall, and wherein the cylindrical plug seal is configured to create a seal to an internal surface of the container.

4. The container cap of claim 2, wherein the connection comprises at least one of an internal screw thread, an external screw thread, a snap ring, an interference connection, a friction connection and a bayonet connection on the container cap, wherein the container cap is configured to trap and seal an open end of the container.

5. The container cap of claim 1, wherein the exterior tubes extend from the upper surface of the cap top.

6. The container cap of claim 5, wherein the upper end of each exterior tube comprises a barbed port.

7. The container cap of claim 1, wherein the at least one fluidic separator is formed between two interior tubular structures extending downwardly from the lower surface of the cap top, wherein the interior tubular structures extend downwardly from the lower surface of the cap and are configured to separate the fluidic passageways.

8. The container cap of claim 7, wherein the interior tubular structures are joined together along their entire lengths.

9. A container assembly configured for sealing attachment to a tube set, the container assembly comprising: a container having a hollow interior configured for receiving and storing a liquid sample; and a container cap configured for connection to the container comprising: an axially extending cylindrical wall; a radially extending cap top disposed within the cylindrical wall, wherein the cap top has an upper surface and a lower surface, wherein the cap top divides the container cap into an upper interior portion within the cylindrical wall above the upper surface of the cap top, and a lower interior portion within the cylindrical wall and below the lower surface of the cap top; and at least two exterior tubes extending from the cap top, wherein each exterior tube defines an exterior fluidic passageway configured to fluidly connect to the tube set; and wherein the lower interior portion comprises at least one fluidic separator extending downwardly from the lower surface of the cap top, wherein the at least one fluidic separator defines at least two interior fluidic passageways each configured to fluidly connect to one of the exterior fluidic passageways and to the hollow interior of the container, wherein each interior fluidic passageway is configured to provide a metering of fluid volume within the attached container.

10. The container assembly of claim 9, further comprising at least one seal configured to seal a connection between the container cap and the container, wherein the at least one seal comprises at least one of a cylindrical plug seal, an internal O-ring, an external O-ring, an internal flat O-ring, and an external flat O-ring.

11. The container assembly of claim 10, wherein the at least one seal comprises a cylindrical plug seal extending downwardly from the lower surface of the cap top and concentrically spaced from the cylindrical wall and internally spaced from the cylindrical wall, and wherein the cylindrical plug seal is configured to create a seal to an internal surface of the container.

12. The container assembly of claim 10, wherein the connection comprises at least one of an internal screw thread, an external screw thread, a snap ring, an interference connection, a friction connection and a bayonet connection on the container cap, wherein the container cap is configured to trap and seal an open end of the container.

13. The container assembly of claim 9, wherein the exterior tubes extend from the upper surface of the cap top.

14. The container assembly of claim 13, wherein the upper end of each of the exterior tubes comprises a barbed port.

15. The container assembly of claim 9, wherein the at least one fluidic separator is formed between two interior tubular structures extending downwardly from the lower surface of the cap top, wherein the interior tubular structures extend downwardly from the lower surface of the cap and are configured to separate the fluidic passageways.

16. The container assembly of claim 15, wherein the two interior tubular structures are joined together along their entire lengths.

17. A fluidic system comprising: a frame; at least one tube set supported by the frame; at least one container assembly supported by the frame; wherein the container assembly comprises: a container having a hollow interior configured for receiving and storing a liquid sample; and a container cap configured for connection to the container comprising: an axially extending cylindrical wall; a radially extending cap top disposed within the cylindrical wall, wherein the cap top has an upper surface and a lower surface, wherein the cap top divides the container cap into an upper interior portion within the cylindrical wall above the upper surface of the cap top, and a lower interior portion within the cylindrical wall and below the lower surface of the cap top; and at least two exterior tubes extending from the cap top, wherein each exterior tube defines an exterior fluidic passageway configured to fluidly connect to the tube set; and wherein the lower interior portion comprises at least one fluidic separator extending downwardly from the lower surface of the cap top, wherein the at least one fluidic separator defines at least two interior fluidic passageways each configured to fluidly connect to one of the exterior fluidic passageways and to the hollow interior of the container, wherein each interior fluidic passageway is configured to provide a metering of fluid volume within the attached container.

* * * * *